United States Patent
Wright et al.

(10) Patent No.: US 10,723,196 B2
(45) Date of Patent: Jul. 28, 2020

(54) HVAC SYSTEM INLET ASSEMBLY

(71) Applicant: Air International (US) Inc., Auburn Hills, MI (US)

(72) Inventors: Wayne Wright, Goodrich, MI (US); Richard Hoyle, Clarkston, MI (US)

(73) Assignee: AIR INTERNATIONAL (US) INC., Auburn Hills, MI (US)

( * ) Notice: Subject to any disclaimer, the term of this patent is extended or adjusted under 35 U.S.C. 154(b) by 170 days.

(21) Appl. No.: 15/381,687

(22) Filed: Dec. 16, 2016

(65) Prior Publication Data

US 2018/0170147 A1    Jun. 21, 2018

(51) Int. Cl.
| | | |
|---|---|---|
| *B60H 1/00* | (2006.01) | |
| *F04D 17/16* | (2006.01) | |
| *F04D 27/00* | (2006.01) | |
| *F04D 29/28* | (2006.01) | |
| *F04D 29/42* | (2006.01) | |

(52) U.S. Cl.
CPC ..... *B60H 1/00471* (2013.01); *B60H 1/00671* (2013.01); *B60H 1/00849* (2013.01); *F04D 17/16* (2013.01); *F04D 27/002* (2013.01); *F04D 27/005* (2013.01); *F04D 29/281* (2013.01); *F04D 29/4213* (2013.01); *B60H 2001/00085* (2013.01); *B60H 2001/00135* (2013.01); *B60H 2001/00607* (2013.01); *B60H 2001/00707* (2013.01)

(58) Field of Classification Search
CPC ...... B60H 1/00471; B60H 2001/00135; F04D 29/4213
USPC ....................................................... 454/139
See application file for complete search history.

(56) References Cited

U.S. PATENT DOCUMENTS

| | | | | |
|---|---|---|---|---|
| 3,285,501 A | * | 11/1966 | McDonald | F04D 29/162 415/116 |
| 3,782,851 A | * | 1/1974 | Hackbarth | B23P 15/04 415/143 |
| 6,135,201 A | | 10/2000 | Nonoyama et al. | |
| 6,164,909 A | * | 12/2000 | Ehlers | F04D 29/281 165/140 |
| 6,166,351 A | | 12/2000 | Yamamoto | |
| 6,311,763 B1 | | 11/2001 | Uemura et al. | |
| 6,575,701 B2 | * | 6/2003 | Kamiya | B60H 1/00471 415/206 |
| 6,893,218 B2 | | 5/2005 | Ito | |

(Continued)

FOREIGN PATENT DOCUMENTS

| | | | |
|---|---|---|---|
| WO | 2016152158 | 9/2016 | |
| WO | WO 2016152158 A1 * | 9/2016 | ......... B60H 1/00678 |

OTHER PUBLICATIONS

International Search Report for International Application No. PCT/US2017/066620 dated Feb. 15, 2018.

*Primary Examiner* — Edelmira Bosques
*Assistant Examiner* — Phillip Decker
(74) *Attorney, Agent, or Firm* — Carlson, Gaskey & Olds, P.C.

(57) ABSTRACT

An HVAC system according to an example of the present disclosure includes a blower rotatable about an axis. The blower has a first blower section and a second blower section fluidly isolated from the first blower section. An inlet assembly at an axial end of the blower includes a first compartment configured to control fluid flow through the first blower section and a second compartment configured to control fluid flow through the second blower section.

15 Claims, 7 Drawing Sheets

(56) References Cited

U.S. PATENT DOCUMENTS

| | | | |
|---|---|---|---|
| 6,964,555 B2* | 11/2005 | Ochiai | F01D 9/026 |
| | | | 415/204 |
| 7,682,233 B2 | 3/2010 | Wang et al. | |
| 8,235,649 B2* | 8/2012 | Kang | B60H 1/00471 |
| | | | 415/102 |
| 8,439,732 B2 | 5/2013 | Belanger | |
| 9,102,214 B2 | 8/2015 | Kishi | |
| 10,421,336 B2* | 9/2019 | Vincent | F04D 17/162 |
| 2003/0190230 A1 | 10/2003 | Ito | |
| 2010/0035534 A1 | 2/2010 | Kajiya | |
| 2011/0005271 A1* | 1/2011 | Seto | B60H 1/00071 |
| | | | 62/515 |
| 2012/0241126 A1 | 9/2012 | Kishi | |
| 2013/0209245 A1* | 8/2013 | Iyer | F04D 25/08 |
| | | | 415/206 |
| 2014/0045417 A1 | 2/2014 | Sakamoto et al. | |
| 2015/0107815 A1 | 4/2015 | HHraguchi et al. | |
| 2016/0355069 A1 | 12/2016 | Vincent | |
| 2017/0096045 A1* | 4/2017 | Jung | B60H 1/0005 |
| 2018/0170146 A1* | 6/2018 | Hoyle | B60H 1/00471 |

\* cited by examiner

HVAC SYSTEM INLET ASSEMBLY

BACKGROUND

Modern vehicles include heating, ventilation, and air conditioning (HVAC) systems for improving passenger comfort.

The present disclosure relates generally to an HVAC assembly, and more particularly to a double-layer flow type vehicular HVAC system that conditions both inside and outside air.

SUMMARY

An HVAC system according to an example of the present disclosure includes a blower rotatable about an axis. The blower has a first blower section and a second blower section fluidly isolated from the first blower section. An inlet assembly at an axial end of the blower includes a first compartment configured to control fluid flow through the first blower section and a second compartment configured to control fluid flow through the second blower section.

In a further embodiment of any of the foregoing embodiments, the blower includes a hub positioned to divide the blower into the first and second blower sections.

In a further embodiment of any of the foregoing embodiments, the inlet assembly includes a first fluid inlet for receiving a first fluid flow, and a second fluid inlet for receiving a second fluid flow.

In a further embodiment of any of the foregoing embodiments, the first fluid flow is fresh air and the second fluid flow is recirculated air.

In a further embodiment of any of the foregoing embodiments, the first and second compartments are each in communication with the first and second inlets, and are each configured to selectively allow fluid flow through one of the first fluid inlet and second fluid inlet and prevent fluid flow through the other of the first fluid inlet and second fluid inlet.

In a further embodiment of any of the foregoing embodiments, the inlet assembly includes a partition fluidly separating the first compartment from the second compartment.

In a further embodiment of any of the foregoing embodiments, the first compartment includes a first door positionable to control the fluid flow, and the second compartment includes a second door positionable to control the fluid flow.

A further embodiment of any of the foregoing embodiments includes comprising a third door positionable to control fluid flow through the first blower section where the first door and third door are rotatable about a common shaft.

In a further embodiment of any of the foregoing embodiments, the second door is substantially centrally located in the inlet assembly and between the first and third doors.

An HVAC system according to an example of the present disclosure includes a blower rotatable about an axis and having a first blower section and a second blower section fluidly isolated from the first blower section. An inlet assembly at an axial end of the blower includes a first inlet for receiving a first fluid flow, and a second inlet for receiving a second fluid flow. A first compartment in fluid communication with the first inlet and the second inlet and includes a first door positionable to allow one of the first fluid flow and second fluid flow into the first compartment. The second compartment is fluidly isolated from the first compartment and in fluid communication with the first inlet and the second inlet and includes a second door positionable to allow one of the first fluid flow and second fluid flow into the second compartment.

In a further embodiment of any of the foregoing embodiments, the first blower section is in fluid communication with the first compartment, and the second blower section is in fluid communication with the second compartment.

In a further embodiment of any of the foregoing embodiments, the first compartment and second compartment are fluidly isolated by a partition.

In a further embodiment of any of the foregoing embodiments, the first blower section and second blower section are fluidly isolated by a hub, and the partition is aligned with the hub.

In a further embodiment of any of the foregoing embodiments, the first fluid flow is fresh air, and the second fluid flow is recirculated air from a vehicle cabin.

In a further embodiment of any of the foregoing embodiments, the first door is positioned to prevent fluid flow from the first inlet and allow fluid flow from the second inlet, and the second door is positioned to prevent fluid flow from the first inlet and allow fluid flow from the second inlet.

In a further embodiment of any of the foregoing embodiments, the first door is positioned to prevent fluid flow from the second inlet and allow fluid flow from the first inlet, and the second door is positioned to prevent fluid flow from the first inlet and allow fluid flow from the second inlet.

In a further embodiment of any of the foregoing embodiments, the first door is positioned to prevent fluid flow from the second inlet and allow fluid flow from the first inlet, and the second door is positioned to prevent fluid flow from the second inlet and allow fluid flow from the first inlet.

In a further embodiment of any of the foregoing embodiments, the first door is positioned to prevent fluid flow from the first inlet and allow fluid flow from the second inlet, and the second door is positioned to prevent fluid flow from the second inlet and allow fluid flow from the first inlet.

These and other features may be best understood from the following specification and drawings, the following which is a brief description.

DETAILED DESCRIPTION

Figure 1:
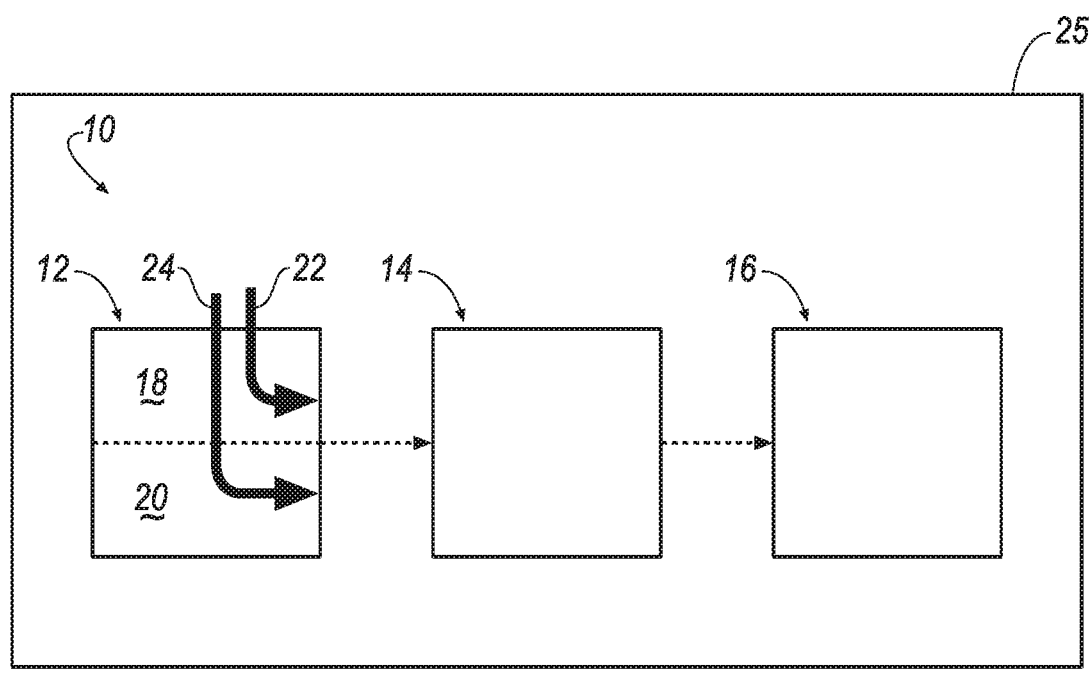
FIG. 1 schematically illustrates an example HVAC system.

FIG. 1 schematically illustrates an HVAC system 10 includes a blower assembly 12 in fluid communication with an HVAC unit 14 adapted to condition airflow for modifying a temperature within a vehicle passenger compartment 16, as shown schematically. The blower assembly 12 includes a blower section 18 for drawing in and passing a fluid flow 22 and a separate blower section 20 for drawing in and passing a fluid flow 24. In one example, one of the fluid flows 22, 24 is outside air, while the other of the fluid flows 22, 24 is inside air recirculated from the passenger compartment 16.

In one example, the HVAC system 10 is a double-layer system positioned inside a vehicle 25 (shown schematically) and is capable of conditioning either of the fluid flows 22, 24 individually or both of the fluid flows 22, 24 at the same time.

Figure 2:
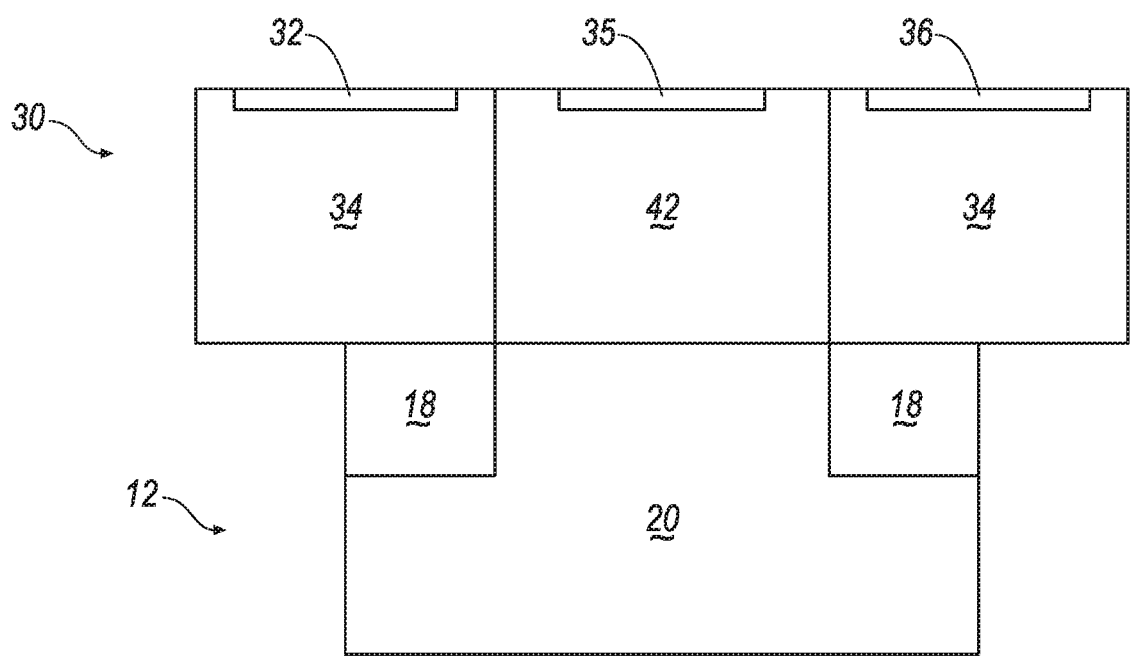
FIG. 2 schematically illustrates an example inlet assembly and blower assembly.

FIG. 2 schematically illustrates a cross-sectional view of an inlet assembly 30 in communication with the blower assembly 12. The inlet assembly 30 includes a first compartment 34 configured to control fluid flow through the blower section 18 and a second compartment 42 configured to control fluid flow through the second blower section 20.

The example inlet assembly 30 includes a first door 32 positionable to control fluid flow through the first compartment 34, a second door 35 positionable to control fluid flow through the second compartment 42, and may include a third door 36 positionable to control fluid flow through the first compartment 34. The compartment 34 and the compartment 42 are fluidly isolated.

The compartment 34 is in communication with the blower section 18, such that the doors 32, 36 control fluid flow through the blower section 18. The compartment 42 is in fluid communication with the blower section 20, such that the door 35 controls fluid flow through the blower section 20. Although the example first compartment 34 includes two doors 32, 36, and the example second compartment 42 includes one door 35, more or fewer doors may be provided in either section.

As one alternative, the first door 32 and third door 36 may be in communication with fluidly separate compartments of the inlet assembly 30, both of which are in fluid communication with the first blower section 18.

Figure 3:
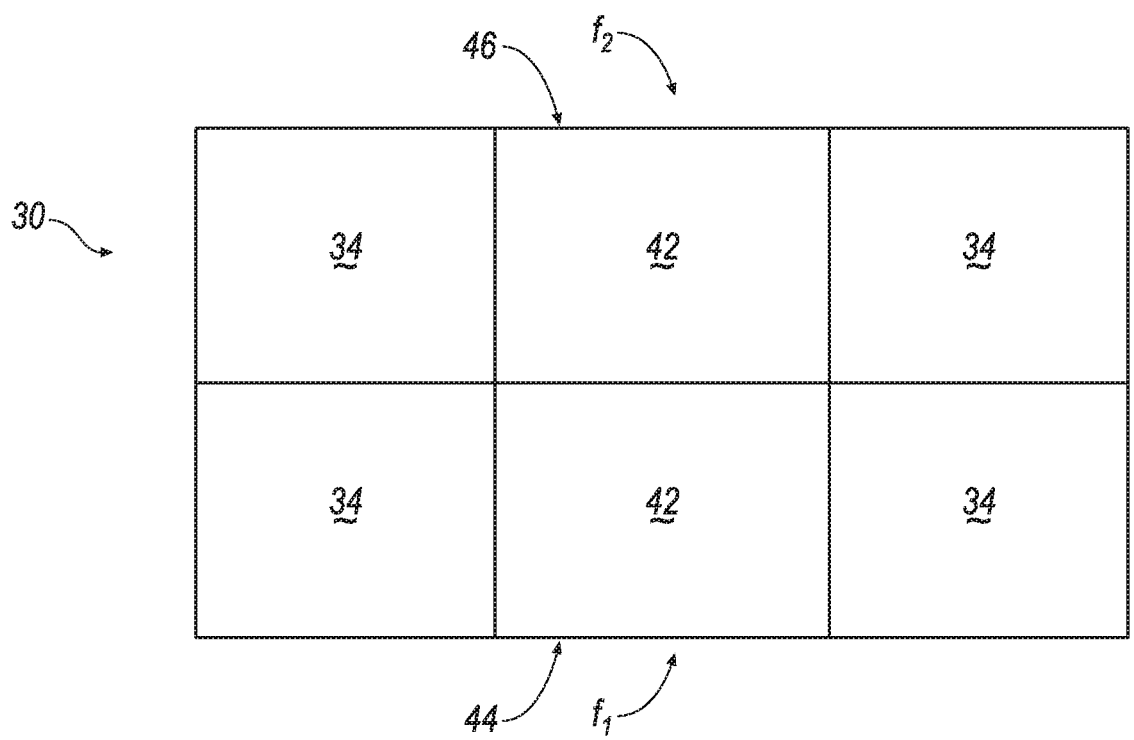
FIG. 3 schematically illustrates an example inlet assembly.

FIG. 3 schematically illustrates an overhead view of the inlet assembly 30. The inlet assembly 30 includes a first fluid inlet 44 and a separate second fluid inlet 46. Each of the compartments 34 and 42 are in communication with the inlets 44, 46. The inlet 44 is configured to receive a fluid flow f1, and the inlet 46 is configured to receive a fluid flow f2. In one example, with reference to FIG. 1, the fluid flow f1 is fluid flow 22, and the fluid flow f2 is fluid flow 24. The fluid flow f1 may be fresh air, and the fluid flow f2 may be recirculated air from the vehicle cabin. The doors 32, 35, 36 (not shown in FIG. 3) are positionable to allow fluid flows f1 or f2 into the compartments 34 and 42, such that each compartment 34, 42 is in fluid communication with each inlet 44, 46.

Figure 4:
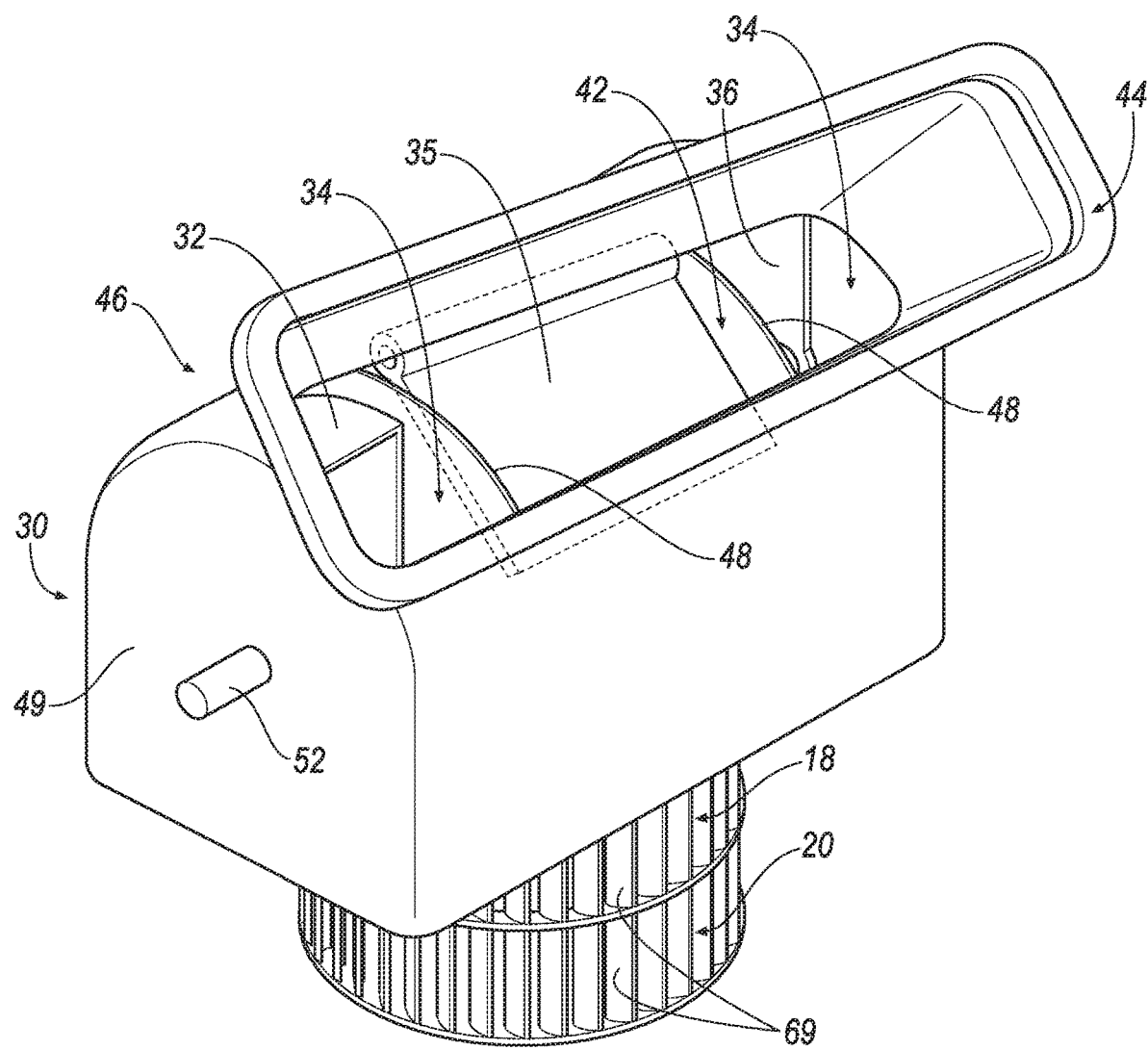
FIG. 4 illustrates a perspective view of an example inlet assembly and blower assembly.

FIG. 4 illustrates an example inlet assembly 30. The first inlet 44 is located at the front side of FIG. 4, while the second inlet 46 is located at the opposite side of the inlet assembly 30, at the back side of FIG. 4. A partition 48 encloses the fluid compartment 42 and fluidly separates the compartment 34 from the compartment 42. In the example, the partition 48 is enclosed by the outer casing 49 of the inlet assembly 30 that encloses the compartment 42. For example, the partition 48 is a divider or combinations of walls or another structure through which fluid cannot pass.

In the example shown in FIG. 4, the doors 32, 36 are shell-style doors, while the door 35 is a flap-style door. One of ordinary skill in the art having the benefit of this disclosure would recognize that other door styles that can prevent airflow may be utilized, including, for example, that the door 35 may be a shell-style door and/or the doors 32, 36 may be flap-style doors.

In the example, the door 35 and the compartment 42 are substantially centrally located within the inlet assembly 30, and located between the doors 32, 36. Such an arrangement allows for even airflow into the blower assembly 12. The centrally located door 35 and compartment 42 create a direct airflow path into the blower section 20, while the doors 32, 36 and compartment 34 on either said of the door 35 and compartment 42 create a direct airflow path into the blower section 18. This arrangement results in even and direct airflow through the blower assembly 12 that results in decreased pressure drop. The doors 32, 36 may be rotatable about a common shaft 52, such that the doors 32, 36 operate to allow fluid flow into the compartment 34 from one of the inlets 44, 46 at a time. In the setting shown, the doors 32, 35, 36 are positioned such that compartment 42 is closed off to the inlet 44 and open to the inlet 46, while compartment 34 is closed off to the inlet 46 and open to inlet 44.

Figure 5:
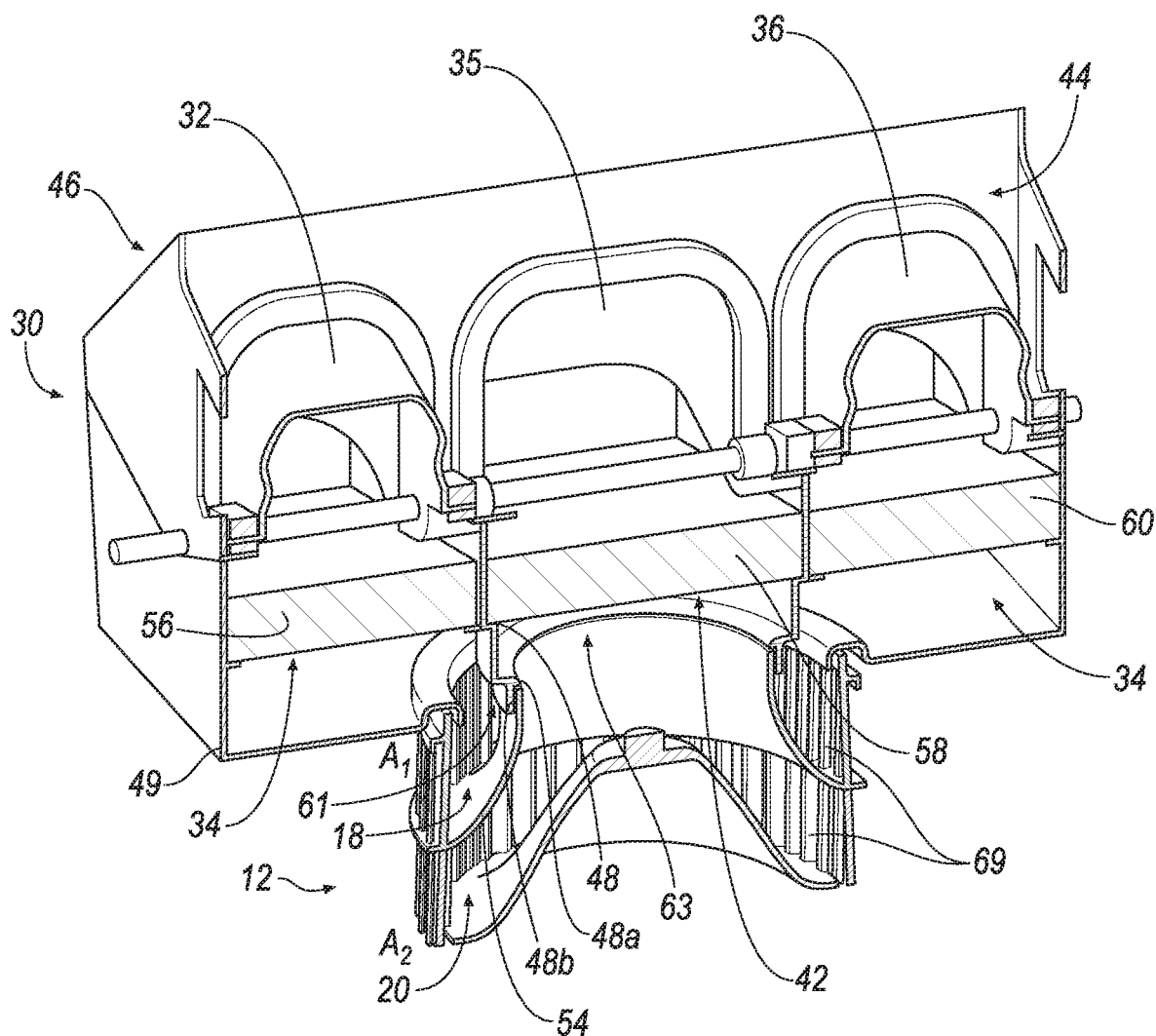
FIG. 5 illustrates a cross sectional view of another example inlet assembly and blower assembly.

FIG. 5 illustrates a cross-sectional view of another example inlet assembly 30 and blower assembly 12. In this example, the door 35 is open to the inlet 44 and closed to the inlet 46, while the doors 32, 36 are closed to the inlet 44 and open to the inlet 46. In the example, the doors 32, 35, 36 are shell-style doors rotatable about a common axis B. Each door is rotatable between a closed inlet 44 and open inlet 46 position and an open inlet 44 and closed inlet 46 position.

In the example, a filter 56 is fluidly between the door 32 and the blower section 18. A filter 58 is fluidly between the door 35 and the blower section 20. Another filter 60 is fluidly between the door 36 and the blower section 18.

As shown, the partition 48 fluidly separates the compartment 42 from the compartment 34. The partition 48 extends from the doors 32, 35, 36 to a hub 54 that fluidly separates the blower section 18 from the blower section 20. The partition 48 is substantially aligned with the hub 54. As one example, the partition 48 includes a radially extending section 48a that is substantially aligned with the hub 54 and an axially extending section 48b from the radially extending section 48a that extends axially inward to the section 18 but radially outward of the hub 54 with enough clearance to allow the hub 54 to rotate. Thus, fluid flowing through the door 35, the compartment 42, and the blower section 20 is kept isolated from fluid flowing through the doors 32, 36, the compartment 34, and the blower section 18.

An outlet 61 to the compartment 34 is provided by the outer casing 49 and the partition 48. The outlet 61 is in fluid communication with the blower section 18 at the axial side A1 of the blower assembly 12. Opposite the partition 48 from the outlet 61 is provided an outlet 63 to the compartment 42 in communication with the blower section 20 at the axial side A1 of the blower assembly 12.

In the example, each of the compartments 34, 42 is located at the axial end A1 of the blower assembly 12 and extend in the axial direction away from the axial end A1 of the blower assembly 12. The airflows 22 and 24 (see FIG. 1) thus both enter the blower assembly 12 through the same axial side A1. One advantage of having the air inlet assembly 30 at a single axial end of the blower is the saving of space inside the vehicle over an assembly that would require separate air inlets on each axial side of the blower. Another advantage is that the disclosed air inlet assembly 30 provides decreased pressure drop because the path of the airflows (both through the same axial side) is more direct than that of prior art systems, resulting in a more efficient HVAC system.

As illustrated schematically in FIGS. 6A-6D, the example inlet assemblies disclosed herein are capable for selection of at least four different airflow combinations.

Figure 6A:
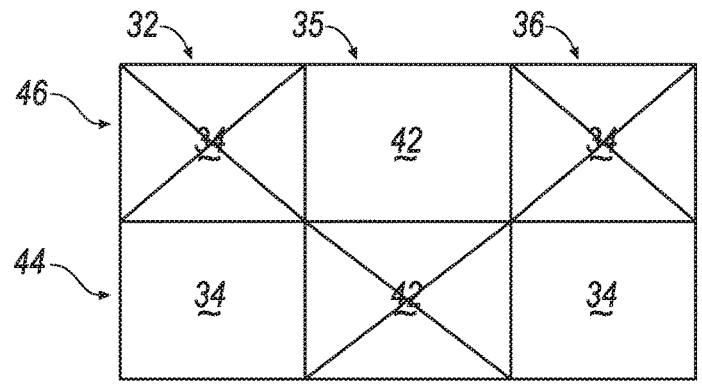
FIGS. 6A, 6B, 6C, and 6D schematically illustrate fluid flow combinations achievable by the example inlet assemblies.

In FIG. 6A, doors 32 and 36 close compartment 34 from inlet 46 and open compartment 34 to inlet 44, while door 35 closes compartment 42 from inlet 44 and opens compartment 42 to inlet 46.

Figure 6B:
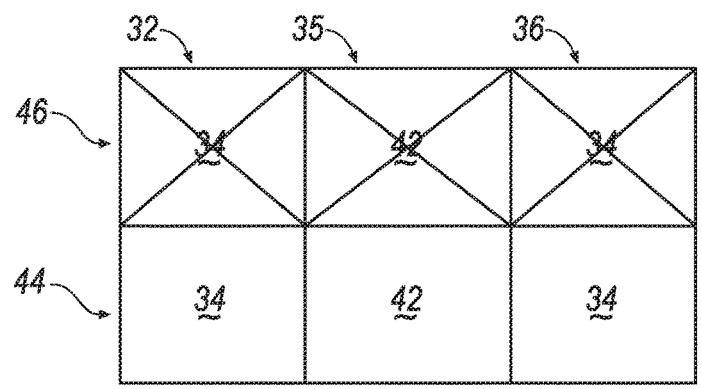

In FIG. 6B doors 32 and 36 close compartment 34 from inlet 46 and open compartment 34 to inlet 44, while door 35 closes compartment 42 from inlet 46 and opens compartment 42 to inlet 46.

Figure 6C:
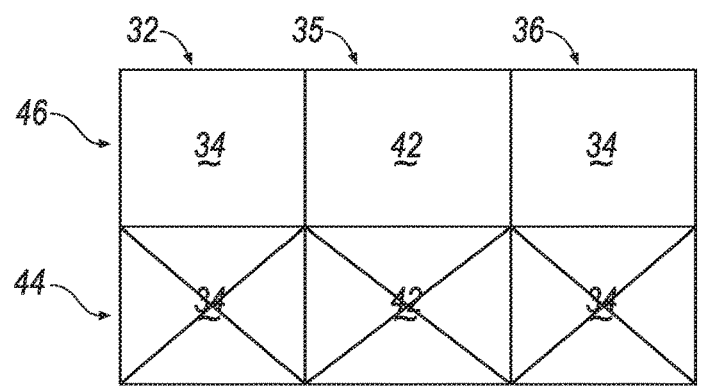

In FIG. 6C, doors 32 and 36 close compartment 34 from inlet 44 and open compartment 34 to inlet 46, while door 35 closes compartment 42 from inlet 44 and opens compartment 42 to inlet 46.

Figure 6D:
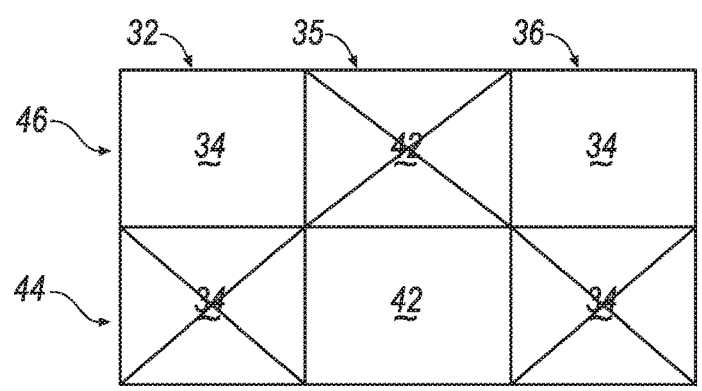

In FIG. 6D, doors 32 and 36 close compartment 34 from inlet 44 and open compartment 34 to inlet 46, while door 35 closes compartment 42 from inlet 46 and opens compartment 42 to inlet 44.

Figure 7:
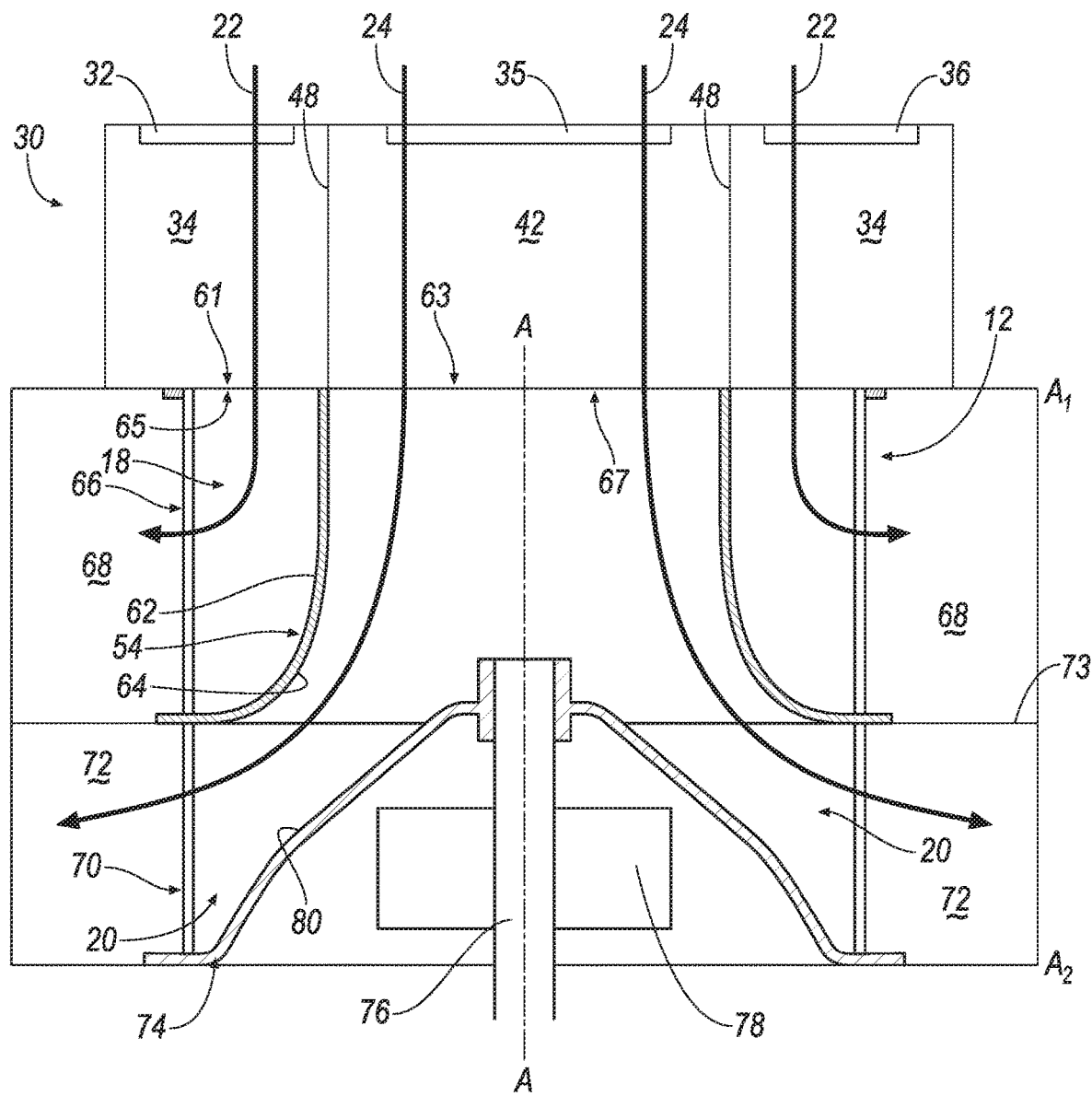
FIG. 7 schematically illustrates a sectional view of an example blower assembly.

FIG. 7 illustrates schematically example fluid flow through the inlet assembly 30 and an example blower assembly 12. The blower assembly 12 communicates the fluid flows 22, 24 separately through the blower assembly 12. The fluid flows 22, 24 may therefore be sourced from fluidly separate compartment 34, 42 in the inlet assembly 30 adjacent an axial end A1 of the blower assembly 12. With reference to FIGS. 3-6, as one example, the fluid flow 24 may come from one of the inlets 44 and 46 and the fluid flow 22 may come from the other of the inlets 44, 46.

For example, the fluid flow 22 may enter compartment 34 through doors 32, 36, exit through outlet 61, enter into the blower section 18 through the opening 65 at the axial end A1, and then exit the blower section 18 radially outwardly through the opening 66 into a housing 68. The fluid flow 24 enters a compartment 42 through a door 35, exits through the outlet 63, and enters the blower section 20 through an opening 67 at the axial end A1 and out of the blower section 20 at the opening 70 into a housing 72.

As the fluid flow 22 flows through the blower section 18, it flows across a radially outer surface 62 of the hub 54 and radially out of the opening 66, which may be defined between a plurality of circumferentially spaced blades 69 (FIG. 4). As the fluid flow 24 flows through the blower section 20, it flows across the radially inner surface of the hub 54 and a radially outer surface 80 of a second hub 74 and out of an opening 70 defined between a plurality of circumferentially spaced blades 69. The hub 74 is generally bell shaped and in communication with a shaft 76 powered by a motor 78. The hub 74 isolates the fluid flow 24 from the shaft 76 and motor 78. The opening 66 is axially separated from the opening 70 by a radially extending portion of the hub 54. Both hubs 54, 74 extend radially outward as they extend axially toward the end A2. As shown in the example, a main body portion of the bell-shaped hub 74, although axially offset from the hub 54, is radially inward of the hub 54.

In the example, the housing 68 and the housing 72 are fluidly separate, and the compartments 34 and 42 are fluidly separate. The housings 68 and 72 are fluidly separated by a partition 73. For example, the partition 73 is a divider or wall or other structure through which fluid cannot pass. The partition 73 may be radially aligned with the hub 54. The fluid flows 22, 24 therefore remain fluidly separate before, during, and after passing through the blower assembly 12.

Figure 8:
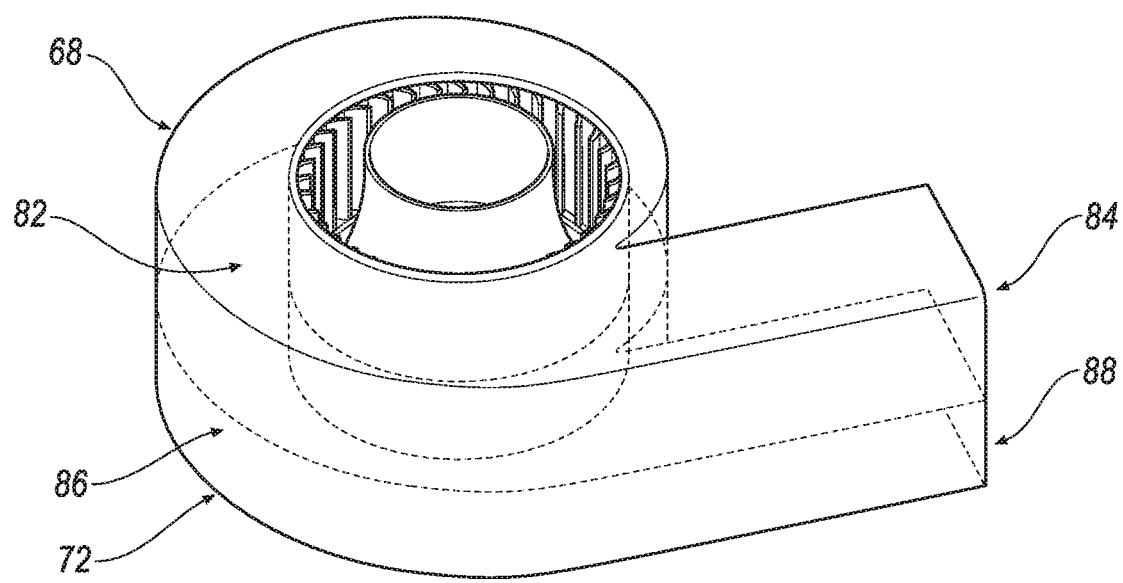
FIG. 8 illustrates a perspective view of an example blower assembly with outer housings.

Referring to FIG. 8, with continued reference to FIGS. 1-5, the housing 68 includes a section 82 radially outward of the blower assembly 12 and an outlet section 84 fluidly downstream of the section 82. The fluid flow through housing 68 travels through the section 82 and out the outlet section 84, which may be in communication with the HVAC unit 14.

Similarly, housing 72 includes a section 86 radially outward of the blower assembly 12 and an outlet section 88 fluidly downstream of the section 86. The fluid flow through the housing 72 travels through the section 86 and out of the outlet section 88, which may be in communication with the HVAC unit 14. In one example, the housing 68 and the housing 72 have substantially the same shape.

In one example, the housing 68 is associated with upper and defrost vents in the vehicle cabin 16 (FIG. 1), and the housing 72 is associated with lower or foot vents in the vehicle cabin 16.

Referring to FIGS. 7 and 8, in an example, the fluid flow 24 may be recirculated air from the passenger compartment 16 (see FIG. 1), and the fluid flow 22 may be air from outside the vehicle. These fluid flows may come through different inlets 44, 46. The fluid flow 24 flows through section 20 of the blower assembly 12 and into housing 72 associated with lower or floor vents in the vehicle cabin. Recirculated air often has higher humidity than fresh air, which makes it less desirable for the upper and defrost vents associated with the blower section 18 and housing 68. Higher humidity in the air in these upper sections may lead to increased fogging in the vehicle glass. An opposite arrangement is also contemplated, in which the fluid flow 22 is recirculated air from the passenger compartment 16 (see FIG. 1), and the fluid flow 24 is air from outside the vehicle. The example HVAC systems disclosed herein are thus compact and efficient systems that keep recirculated air isolated from fresh air before, during, and after flowing through the blower assembly 12.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. An HVAC system comprising:
a blower rotatable about an axis, the blower having first blower section and a second blower section fluidly isolated from the first blower section by a hub;
an inlet assembly at an axial end of the blower, the inlet assembly including a first compartment configured to control fluid flow through the first blower section and a second compartment configured to control fluid flow through the second blower section,
wherein the first compartment includes a first door positionable to control the fluid flow through the first blower section, the second compartment includes a second door positionable to control the fluid flow through the second blower section, the first compartment includes a third door positionable to control fluid flow through the first blower section, the first door and third door are rotatable about a common shaft, and the second door is substantially centrally located in the inlet assembly and between the first and third doors, wherein the first door and third door are positionable such that the first door is in an open position when the third door is in an open position, and the first door is in a closed position when the third door is in a closed position wherein the inlet assembly includes a partition fluidly isolating the first compartment from the second compartment, the partition extends from the shaft to the hub, the partition and the hub are separate structures, the hub is rotatable with the blower, and the partition is fixed with the inlet assembly.

2. The HVAC system as recited in claim 1, wherein the inlet assembly includes a first fluid inlet for receiving a first fluid flow, and a second fluid inlet for receiving a second fluid flow, the first door is positionable to allow and block fluid flow into the first compartment through each of the first inlet and the second inlet, the second door is positionable to allow and block fluid flow into the second compartment through each of the first inlet and the second inlet, and the third door is positionable to allow and block fluid flow into the first compartment through each of the first inlet and the second inlet.

3. The HVAC system as recited in claim 2, wherein the first fluid flow is fresh air and the second fluid flow is recirculated air.

4. The HVAC system as recited in claim 1, wherein the blower includes a plurality of blades, and the hub includes a portion that extends radially outward of the plurality of blades.

5. The HVAC system as recited in claim 1, wherein the partition includes a radially extending flange and an axially extending portion extending from the flange, the axially extending portion extends into the first blower section and radially outward of the hub, and the axially extending portion is spaced from the hub to allow the hub to rotate.

6. The HVAC system as recited in claim 1, comprising:
a first filter between the first door and the first blower section;
a second filter between the second door and the second blower section; and
a third filter between the third door and the first blower section.

7. The HVAC system as recited in claim 6,
wherein the partition includes an upper edge spaced farthest from the blower, and the first filter, the second filter, and the third filter are each nearer the blower than the upper edge is near the blower.

8. The HVAC system as recited in claim 1, wherein the common shaft is rotatable about an axis, and the second door is rotatable about the same axis.

9. The HVAC system as recited in claim 1, wherein the first door and the third door are shell doors, and the second door is a flap door, the common shaft is rotatable about an axis, and the second door is rotatable about a second axis parallel to the first axis.

10. The HVAC system as recited in claim 1, wherein fluid flows into the first blower section from the first compartment through a first hub opening in the hub, fluid flows into the second blower section from the second compartment through a second hub opening in the hub, the second hub opening is centrally located relative to the hub, and the first hub opening is radially outward of the second hub opening relative to the hub.

11. An HVAC system comprising:
a blower rotatable about an axis, the blower having first blower section and a second blower section fluidly isolated from the first blower section by a hub; and
an inlet assembly at an axial end of the blower, the inlet assembly including an outer casing providing a first inlet at a first side and a second inlet at a second side opposite the first side, a first compartment configured to control fluid flow through the first blower section, a second compartment configured to control fluid flow through the second blower section, a partition that fluidly isolates the first compartment from the second compartment within the outer casing, a first opening provided at an upper end of the partition and configured to allow fluid flow into the first compartment from each of the first inlet and the second inlet, a second opening provided at an upper end of the partition and configured to allow fluid flow into the second compartment from each of the first inlet and the second inlet, a third opening provided at an upper end of the partition and configured to allow fluid flow into the first compartment from each of the first inlet and the second inlet, a first door positionable to allow and block fluid flow through the first opening from each of the first inlet and the second inlet, a second door positionable to allow and block fluid flow through the second opening from each of the first inlet and the second inlet, and a third door positionable to allow and block fluid flow through the third opening from each of the first inlet and the second inlet, wherein the second door and second opening are substantially centrally located relative to the inlet assembly, such that the second door is located between the first door and the third door, and the second opening is located between the first opening and the third opening, wherein the first door and third door are positionable such that the first door is in an open position when the third door is in an open position, the first door is in a closed position when the third door is in a closed position, the first door and the third door are rotatable about a common shaft, and the partition extends from the shaft to the hub.

12. The HVAC system as recited in claim 11, wherein the first door and the third door are shell doors.

13. The HVAC system as recited in claim 11, comprising
a first filter fluidly between the first opening and the blower;
a second filter fluidly between the second opening and the blower; and
a third filter fluidly between the third opening and the blower.

14. The HVAC system as recited in claim 13, wherein the partition includes a radially extending flange and an axially extending portion extending from the flange, the axially extending portion extends into the first blower section and radially outward of the hub, and the axially extending portion is spaced from the hub to allow the hub to rotate.

15. The HVAC system as recited in claim 11, wherein the first door and the third door are rotatable about a first axis, and the second door is rotatable about a second axis different from the first axis.

* * * * *